United States Patent [19]
Krishnan

[11] Patent Number: 5,799,002
[45] Date of Patent: Aug. 25, 1998

[54] ADAPTIVE BANDWIDTH THROTTLING FOR NETWORK SERVICES

[75] Inventor: Murali R. Krishnan, Bellevue, Wash.

[73] Assignee: Microsoft Corporation, Redmond, Wash.

[21] Appl. No.: 674,684

[22] Filed: Jul. 2, 1996

[51] Int. Cl.$^6$ ............................................. H04L 12/26
[52] U.S. Cl. ............................................. 370/234
[58] Field of Search ........................ 370/230–239; 395/200.62, 200.63, 200.64, 200.65

[56] References Cited

U.S. PATENT DOCUMENTS

| | | | |
|---|---|---|---|
| 4,914,650 | 4/1990 | Sriram | 370/60 |
| 5,313,454 | 5/1994 | Bustini et al. | 370/231 |
| 5,359,320 | 10/1994 | Jaffe et al. | 340/825.5 |
| 5,381,413 | 1/1995 | Tobagi et al. | 370/448 |
| 5,432,737 | 7/1995 | Chethik | 370/79 |
| 5,477,542 | 12/1995 | Takahara et al. | 370/94.1 |
| 5,600,798 | 2/1997 | Cherukuri et al. | 395/200.62 |
| 5,633,861 | 5/1997 | Hanson et al. | 370/232 |

Primary Examiner—Chi H. Pham
Assistant Examiner—W. Todd Baker
Attorney, Agent, or Firm—Duft, Graziano & Forest, PC

[57] ABSTRACT

The adaptive bandwidth throttling system implements a graceful diminution of services to the clients by delaying a first class of services provided by a network server in response to the effective bandwidth utilized by this network server exceeding a first threshold. If the demand for the bandwidth by this network server exceeds a second threshold, the bandwidth throttling system escalates the throttling response and blocks the first class of services from execution and can also concurrently delay execution of a second class of services. The implementation of the throttling process can be varied, to include additional levels of response or finer gradations of the response, to include subsets of a class of services. In addition, the threshold levels of bandwidth used to trigger the throttling response can be selected as desired by the system administrator. Typically, once the effective bandwidth utilization is approximately equal to the allocated bandwidth for the network server, the first level of the hierarchical bandwidth throttling is activated. The second level of the hierarchical bandwidth throttling is activated once the effective bandwidth utilization exceeds the allocated bandwidth for the network server by greater than a predetermined amount.

18 Claims, 3 Drawing Sheets

ADAPTIVE BANDWIDTH THROTTLING FOR NETWORK SERVICES

FIELD OF THE INVENTION

This invention relates to network servers resident on a host computer system and, in particular, to a bandwidth management system which throttles the demands by client processes executing on remote computer systems for network transmission bandwidth.

PROBLEM

In a host computer system, there can be a plurality of network servers, each of which functions to process requests received from processes executing on remote computer systems (clients). The host computer system is interconnected with the plurality of remote computer systems through the medium of a network, such as Internet. The network typically has a predefined bandwidth capacity which is shared among a number of interconnected computer systems. Each computer system is typically allotted a limited fixed allocation of network bandwidth through which to serve requests received from the client processes. When the allocated network bandwidth becomes saturated with client requests and server responses, some of the data is either delayed in transmission or not delivered to the intended destination. Therefore, some form of request throttling mechanism is necessary to minimize network congestion and efficiently utilize the allocated network bandwidth.

In the case of multiple network servers executing on a single host computer system and sharing a fixed bandwidth communication link to the network, some network servers can disproportionately allocate this network bandwidth to their tasks, thereby excluding other concurrently executing network servers from performing their requested operations. In this case, the bandwidth throttling must be effected among the plurality of network severs which are concurrently executing on the host computer system.

It is therefore a problem to allocate bandwidth to the network server processes in a manner which enables the maximum number of requests to be served without network congestion and to also avoid impacting other network servers which may be executing on the same host computer system.

There have been many implementations of bandwidth allocation and congestion control schemes to address this problem. U.S. Pat. No. 4,914,650 discloses an integrated voice and data network which includes a multiplexer which functions to connect the host computer system with the network. The multiplexer is equipped with a voice queue for storing voice packets and a data queue for storing data packets. Both the voice packets and the data packets are transmitted uninterrupted for a respective predetermined interval, whose respective durations may be different. Signaling messages which are exchanged among the computer systems via the network preempt the voice and data transmissions to ensure that signaling messages are serviced with very low delay and zero packet loss. In addition, the bandwidth allocated for each type of transmission, if unused, can be momentarily allocated to the other type of transmission to maintain a high level of service.

U.S. Pat. No. 5,313,454 discloses a feedback control system for congestion prevention in a packet switching network. Congestion control is achieved by controlling the transmission rate of bursty traffic when delay sensitive data is present for transmission. The bursty data is relatively insensitive to delay and can be queued for a reasonable period of time. Data indicative of the queue length is broadcast via the network to the destination node where it is processed and a control signal returned to the originating node to regulate the rate of transmission of the bursty data.

U.S. Pat. No. 5,359,320 discloses a scheduling mechanism for a network arbitration circuit in a broadcast network environment. The scheduling mechanism delays the arbitration circuit from seeking access to the network if the network traffic exceeds a first predetermined threshold and the local traffic in the node exceeds a second predetermined threshold. This scheduling mechanism therefore responds to both local and global congestion to throttle the production of new requests.

U.S. Pat. No. 5,432,787 discloses a packet switching system which appends a parity packet to each predetermined number of data packets. The number of data packets which are transmitted before the parity packet is appended thereto is a function of the network traffic and the measured network error rate.

U.S. Pat. No. 5,477,542 discloses a packet switching network which interconnects a plurality of terminal stations for transmitting video and voice data packets. The terminal stations which are operating in the receive mode transmit control signals to the associated transmitting terminal stations to indicate the amount of delay that the received packets have experienced in traversing the network. If the delay exceeds a predetermined threshold, the video packets are delayed and the voice packets are preferentially transmitted, since the voice packets are more sensitive to transmission delays.

Thus, there are numerous existing network congestion control mechanisms available to regulate the transmission rate of data through a network. However, the common thread in all of these systems is that a single control mechanism is provided to effect the desired congestion control. These control schemes are typically binary in nature, being either active or disabled. There is presently no known hierarchical network congestion control system which differentially responds to various levels of congestion. Furthermore, these congestion control schemes operate without regard for the nature of the processes that are extant on the network servers.

SOLUTION

The above described problems are solved and a technical advance achieved in the art by the adaptive bandwidth throttling system of the present invention which provides a hierarchically organized response to network congestion to escalate the actions taken to mitigate the traffic presented to the network in response to various levels of congestion. The bandwidth throttling system operates on a host computer system to allocate bandwidth to the network servers which are executing on the host computer system as a function of system administrator defined thresholds. The management of the plurality of network servers can be independent of each other, or may be coordinated, as the system administrator deems appropriate. In addition, the bandwidth throttling system can customize the system response as a function of the specific network process which is being regulated. Thus, the throttling mechanism can be crafted to correspond to unique needs of the various network servers.

The bandwidth throttling system implements a graceful diminution of services to the clients by implementing a series (at least two) of successively significant bandwidth throttling actions in response to a corresponding one of a plurality of thresholds of increasing magnitude being exceeded. For example, the bandwidth throttling system can delay a first class of services provided by a network server in response to the effective bandwidth utilized by this network server exceeding a first threshold. If the demand for the bandwidth by this network server exceeds a second threshold, the bandwidth throttling system escalates the throttling response and blocks the first class of services from execution and can also concurrently delay execution of a second class of services. The second level of response alternatively can include blocking only selected members of the first class of services and delaying additional services, previously not impacted by the bandwidth throttling process. The implementation of the throttling process can be varied, to include additional levels of response (>2) or finer gradations of the response, and to include subsets of a class of services. In addition, the threshold levels of bandwidth used to trigger the throttling response can be selected as desired by the system administrator. Typically, once the effective bandwidth utilization is approximately equal to the allocated bandwidth for the network server, the first level of the hierarchical bandwidth throttling is activated. The second level of the hierarchical bandwidth throttling is activated once the effective bandwidth utilization exceeds the allocated bandwidth for the network server by greater than a predetermined amount.

By implementing a hierarchical response to excessive network traffic, the impact on the various network services are minimized. The ability to customize the bandwidth throttling to specific subclasses of services enables the system to impact the services which are deemed by the system administrator to be of the lowest priority and/or whose reduction of service levels has the most beneficial effect on the network. Thus, the adaptive bandwidth throttling system provides a graduated throttling process to incrementally reduce the demand for network bandwidth without disrupting the provision of desired network services.

DETAILED DESCRIPTION

Network servers are processes which execute on a host computer system and which function to serve requests for service received from remote computer systems. The host computer system providing the requested service is typically termed the server. The remote computer system initiating the request is termed the client. The data exchanged between the host and remote computer systems is transmitted in units termed packets, each of which consists of at least one byte of data. The allocation of work between the client and server typically comprises a client process requesting a server process to read and write identified data files. The data files as well as the request and response messages are transmitted via the medium of the network which interconnects the computer systems on which the client and server processes execute.

The processing of a client originated service request begins with the network server receiving one or more request packets from the client via the network. Upon receipt of the request, the network server parses the request contained in the request packets, processes the request and responds by transmitting one or more response packets to the client via the network. If the network becomes saturated with data transmissions, some of the request and/or response packets may not be delivered to their intended destination. It is possible that a host computer may be running a plurality of network servers, thus limiting the processing resources which are available for any of the plurality of network servers. In such a scenario, control of the amount of the network bandwidth used by any one network server allows both that server as well as the other servers to perform more efficiently.

System administrators manage the network servers by utilizing the information that the administrators have collected regarding the processing requirements of the various services available from the network servers, as well as the requirements of the typical clients. In particular, some network services generate data which is intolerant of transmission delays while other network services generate data which is relatively delay insensitive. For example, bursty data is relatively insensitive to delay and can be queued for a reasonable period of time. In a combined voice-video data transmission system, video packets can be delayed while the voice packets are preferentially transmitted, since the voice packets are more sensitive to transmission delays than the video packets. In addition, some services are more response critical, having a higher priority than others. Using this data, as well as information regarding the data transmission patterns of existing systems, the administrator can specify resource usage for the plurality of network servers extant on the host computer system.

System Architecture

Figure 1:
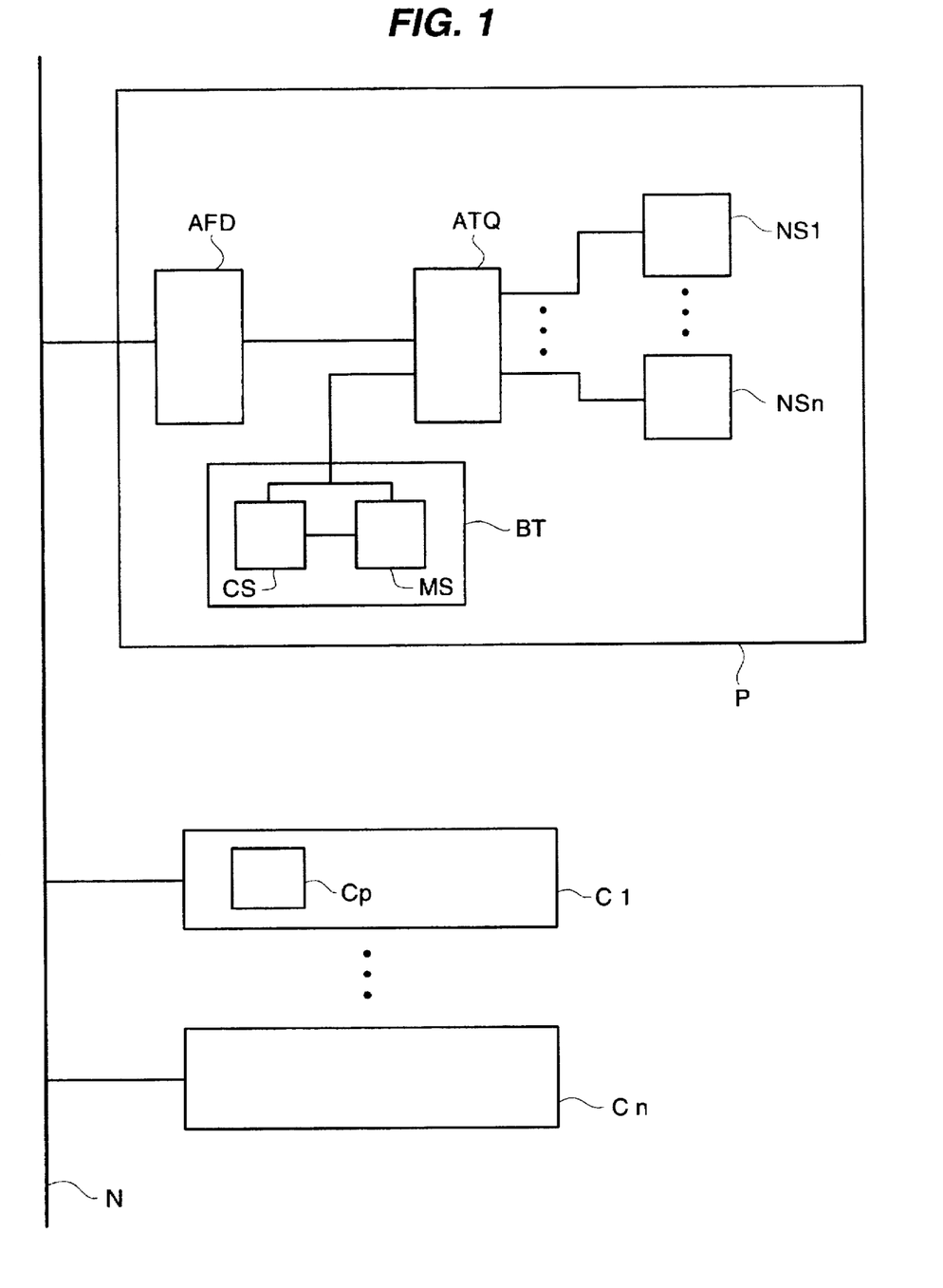
FIG. 1 illustrates in block diagram form the overall architecture of the adaptive bandwidth throttling system and an environment in which it operates.
Figure 2:
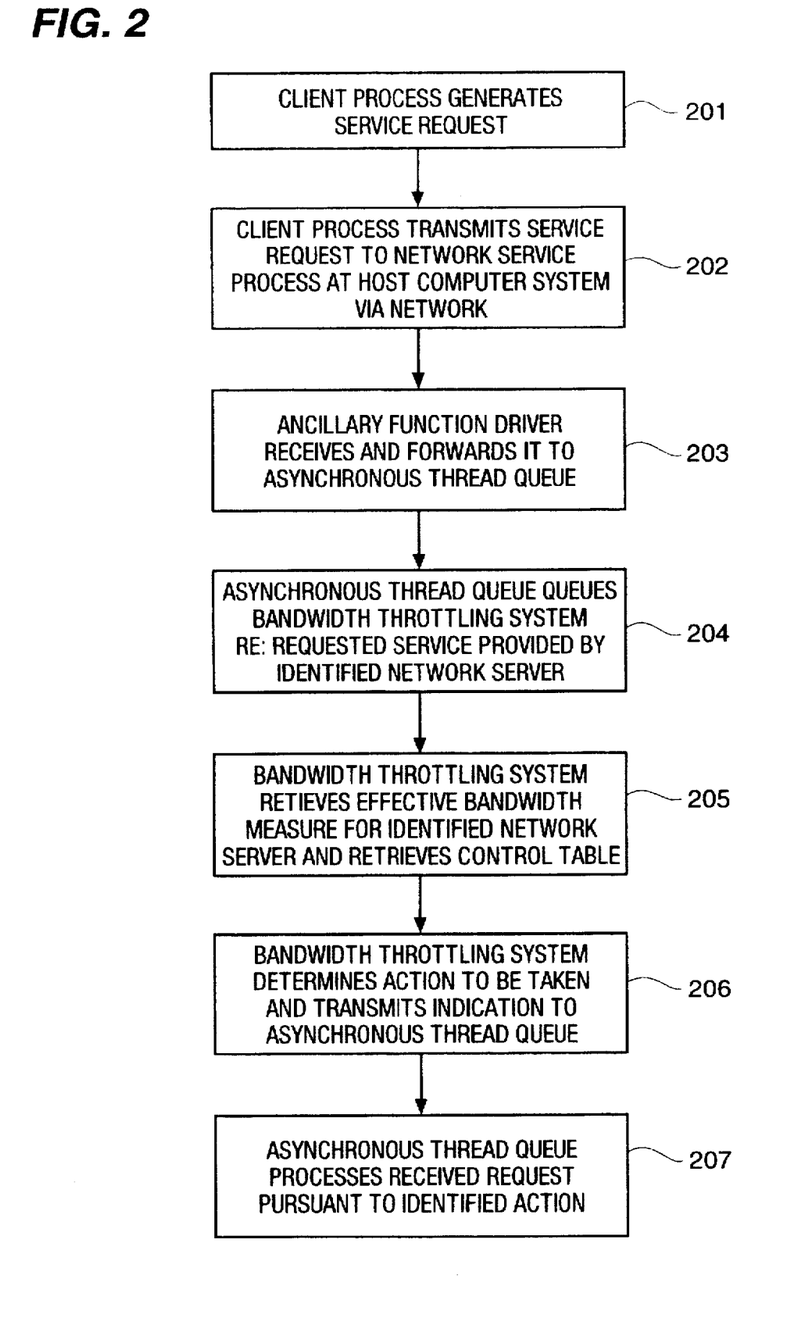
FIG. 2 illustrates in flow diagram form the operation of the overall system, including the adaptive bandwidth throttling system, in responding to service requests.
Figure 3:
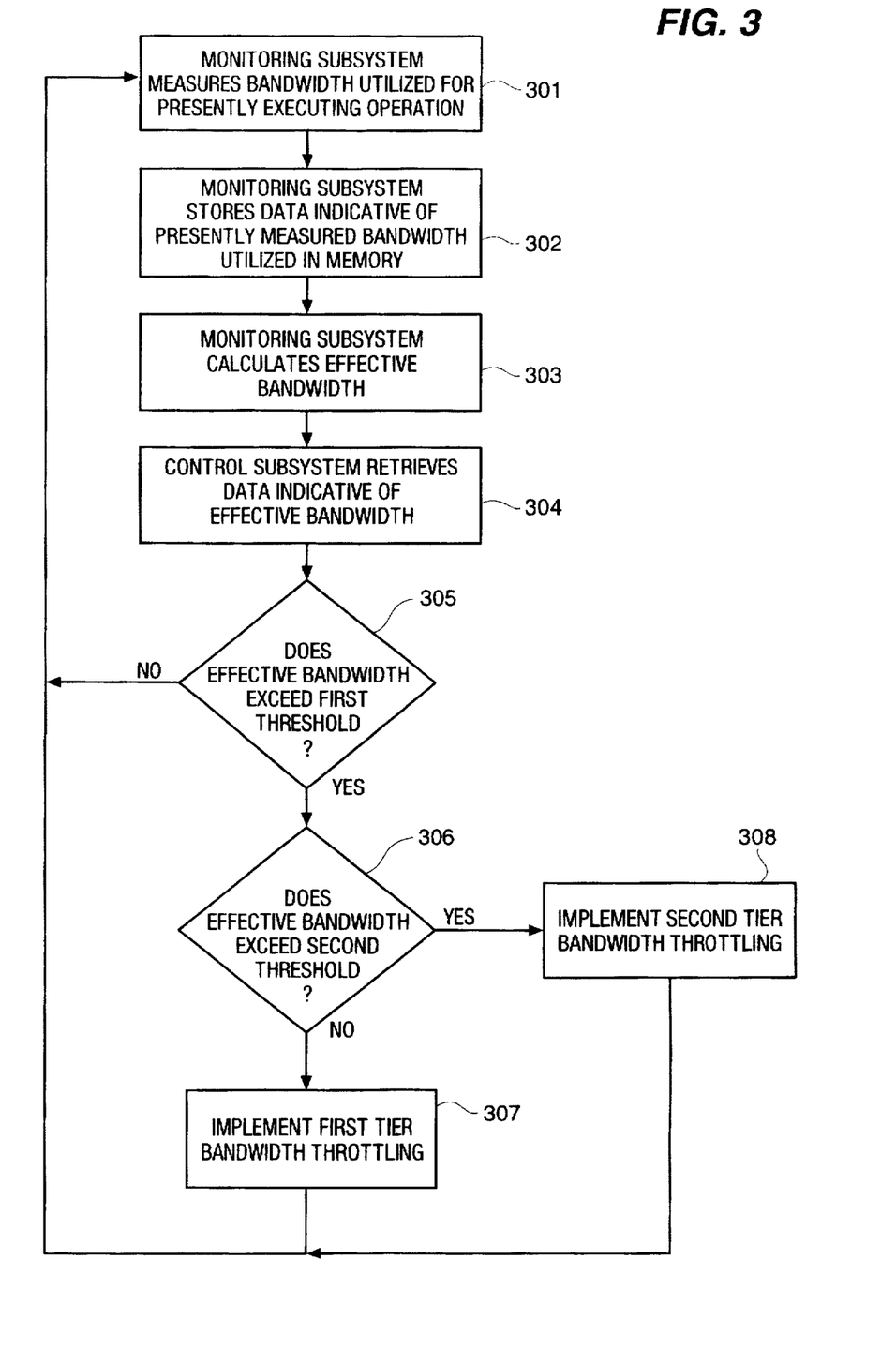
FIG. 3 illustrates in flow diagram form the operation of the adaptive bandwidth throttling system.

FIG. 1 illustrates in block diagram form the overall architecture of the adaptive bandwidth throttling system BT and an environment in which it operates, while FIGS. 2 and 3 illustrate in flow diagram form the operation of the adaptive bandwidth throttling system BT. The adaptive bandwidth throttling system of the present invention is described as implemented in software, although this system can alternatively be implemented as hardware elements or a combination of hardware and software elements. The adaptive bandwidth throttling system functions to limit the bandwidth usage of each of the plurality of services provided by the plurality of network servers NS1–NSm extant on the host computer system P to the allocated maximum network bandwidth. This control is architected to achieve the minimum impact on the network servers NS1–NSm while concurrently having the maximum impact on network congestion. In selecting an implementation of a bandwidth control mechanism, it is important to note that once a network service initiates a response process, that effort is lost if the response is not executed to completion. Therefore, bandwidth throttling procedures should terminate a service before substantial processing effort is expended. In addition, the typical client-server interaction operates on a request-response paradigm. In particular, the client transmits a request to the server and the only communication that is received by the client is the response to the request. There is no interprocess communication. Thus, rejecting and/or delaying requests typically results in a subsequent retry by the requesting client process, which consumes both processor and network resources, although in a time delayed manner. The client process can continue to send requests to an overloaded server without the server being capable of throttling this request process. An alternative interprocess communication scheme enables the server to notify the client of the server condition, thereby providing feedback to the requesting client to terminate future requests until the overload is cleared. The adaptive bandwidth throttling system of the present invention is operable in both of these environments.

The adaptive bandwidth throttling system BT is based on a feedback system that continuously monitors the bandwidth consumed by each network server NS1–NSm and initiates action when a network server reaches the threshold defined by the allocated network bandwidth for that network server. In particular, the bandwidth throttling system BT executes as a process on the host computer system P. The host computer system P contains at least one and more typically a plurality of network servers NS1–NSm which concurrently execute as independent processes. The host computer system P is connected via an auxiliary function driver AFD to a physical network N which interconnects the host computer system P to one or more remote computer systems C1–Cn, each of which have operational thereon a plurality of client processes (only client process CP is illustrated for the sake of simplicity), each of which generate the service request packets. An asynchronous thread queue ATQ interconnects the network servers NS1–NSm, the bandwidth throttling system BT and the ancillary function driver AFD. The asynchronous thread queue ATQ performs the input and output operations with respect to the connected network N by providing functions to read, write and transmit data files over network connections using the sockets capability of the host computer system P. The asynchronous thread queue ATQ communicates with the ancillary function driver AFD and the windows sockets driver (not shown) resident on the host computer system P to perform the required input and output operations over the network N.

Method of Operation of Bandwidth Throttling System

FIG. 2 illustrates, in flow diagram form, an example of the basic operation of client-server communications in the context of the bandwidth throttling system BT. At step 201, the client process CP resident on remote computer system C1 generates a request for a network service, which network service is provided by a network server NS1 which is executing on the host computer system P. The generated request is processed at step 202 into a series of request packets and transmitted via network N to the host computer system P attached to network N. The request transmission is accomplished in a manner which is well known, and the request can be addressed specifically to the network server NS1 on host computer system P or the request can be addressed via use of a mnemonic which identifies a service, which can be provided by any available one of a plurality of host computer systems which are connected to the network N. The service request transmitted over the network N is received from the client process CP at step 203 by the ancillary function driver AFD and forwarded to the asynchronous thread queue ATQ. The asynchronous thread queue ATQ queries the bandwidth throttling system BT at step 204 to ensure that the requested operation is permitted for the identified network service. This determination is made at step 205 where the bandwidth throttling system BT retrieves the effective bandwidth measure for the identified network server NS1 and compares this value with data stored in a control table which is indicative of the network bandwidth allocated to this network server NS1. At step 206, the bandwidth throttling system BT transmits an indication of the determined action to be taken to the asynchronous thread queue ATQ which processes the received request at step 207.

If the requested operation is permitted, the asynchronous thread queue ATQ enables the operation to execute. If the requested operation is not permitted, the asynchronous thread queue ATQ regulates the operation pursuant to the control procedure indicated by the bandwidth throttling system BT. In particular, operations that are designated as rejected are prevented from proceeding and a control packet can be returned to the requesting client process CP via the network N to indicate that the requested service is unavailable at this time. If the requested operation is designated in the delay category, the asynchronous thread queue ATQ stores the received request and returns a control packet to the requesting client process CP to indicate that the operation is pending.

For every operation which is allowed to execute, the asynchronous thread queue ATQ transmits data indicative of the number of bytes processed by execution of the requested operation to the measurement subsystem MS of the bandwidth throttling system BT. The measurement subsystem MS uses this received data to update the bandwidth usage data stored in the bandwidth throttling system BT and periodically computes the effective bandwidth for this network server at regular intervals. The control subsystem CS of the bandwidth throttling system BT uses the computed effective bandwidth to update its internal control tables and thereby regulate the operation of the network servers NS1–NSm.

Control Philosophy

FIG. 3 illustrates in flow diagram form the process used by the bandwidth throttling system BT to regulate the operation of the various network servers NS1–NSm extant on the host computer system P. The bandwidth throttling system BT monitors the operations performed by the asynchronous thread queue ATQ to ascertain the bandwidth utilized by each of the network servers NS1–NSm. The bandwidth throttling system BT consists of two subsystems: a measurement subsystem MS to measure the bandwidth usage for each of the network servers; a control subsystem CS which applies feedback based control to the asynchronous thread queue ATQ to limit the bandwidth used by each network server NS1–NSm. The network operations which are monitored by the bandwidth throttling system BT are: receive, send, and transmit file. The measurement subsystem MS, at step 301, monitors not only the operations which are performed by each network server NS1–NSm, but also the data flow rate for each operation, in the form of effective real time bandwidth consumed. The effective real time bandwidth is determined by calculating the bandwidth for each operation which is performed and averaging the bandwidth utilization over the last n operations performed. To limit the complexity, the monitoring subsystem MS does not maintain a complete history of all operations, but instead maintains a histogram of bandwidth values for the last most recent n time intervals. These values are accumulated by time stamping the start and end times of each operation. If the operation proceeds to completion, the monitoring subsystem MS calculates the bandwidth by dividing the bytes transferred during the operation by the time interval duration. The resultant bandwidth value is stored, at step 302, in the n last time interval histogram, which set of values is used at step 303 to periodically compute an effective bandwidth for this network server.

The control subsystem CS, at step 304, receives the effective bandwidth data generated by the measurement subsystem MS and uses this information to regulate the operation of the various network servers. In operation, the control subsystem CS invokes the measurement subsystem MS to compute the effective bandwidth, M, for each network server. The control subsystem CS of the bandwidth throttling system BT uses three classes of operations to characterize the nature of the operation: Read (R), Write (W), and Transmit (T); in addition to two subclasses: Large (L) and Small (S) to denote the size of the data involved. The list of monitored operations is therefor Read (R), Write-Small (WS), Write-Large (WL), Transmit-Small (TS), and Transmit-Large (TL). The breakpoint between large and small data transfers is empirically determined and can differ for read and write operations, and can vary among the network servers NS1–NSm. With these categories, the allocated bandwidth for a particular network server, and the present effective bandwidth determined by the monitoring subsystem MS, the control subsystem CS determines whether it is safe (allow), marginally safe (delay) or unsafe (block) to perform a particular requested operation. This decision is based upon a set for factors: the specific nature of the operation, the dynamic behavior of the network server, the amount of processor and memory resources consumed by and required by the requested operation, the estimated and specified bandwidths. Thus, the operation of the adaptive bandwidth throttling system can be customized for the operating characteristics of the specific network server.

Hierarchical Response Process

Tables A and B indicate two views of a typical list of the actions taken by the control subsystem CS for each of the identified operations at various levels of bandwidth consumption for one (NS1) of the plurality of network servers NS1–NSm operational on the host computer system P:

TABLE A

Control Table

| | No Action Taken | Services Delayed | Services Blocked |
|---|---|---|---|
| M < B | R, WS, WL, TS, TL | | |
| M ≈ B | WS, WL, TS, TL | R | |
| M > B | WS, TS | WL, TL | R |

TABLE B

Control Table

| | Action | Threshold |
|---|---|---|
| M < B | Allow R, WS, WL, TS, TL | |
| M ≡ B | Allow WS, WL, TS, TL<br>Delay R | B − δ |
| M > B | Allow WS, TS<br>Delay WL, TL<br>Block R | B + δ |

In particular, it is assumed that the identified network server is allocated a maximum bandwidth of B, with the computed effective bandwidth consumed being M. The responses by the control subsystem CS are listed across the top of Table A and consist of: no action taken, services delayed, and services blocked. Table B provides an alternative presentation of the information provided in Table A. In the first case illustrated in Tables A and B, the effective bandwidth consumed by the network server is less than the bandwidth (B) allocated for this network server by greater than a predetermined amount M>(δ). In this instance, at step 305, the control subsystem CS determines that the effective bandwidth does not exceed the bandwidth (B) allocated for the identified network server NS1 and no action need be taken, since there is sufficient bandwidth to perform all of the requested operations. The control subsystem CS therefore takes no control action, processing returns to step 301, and the measurement subsystem MS continues to measure the bandwidth consumed by the network server and keeps track of the effective bandwidth utilization.

In the second case listed in Tables A and B the first threshold (B−δ) is exceeded, and it is determined at step 305 that the bandwidth consumed by the network server is at or has begun to exceed the bandwidth (B) allocated for this network server (B−δ<M<B+δ). The control subsystem CS at step 306 determines whether the effective bandwidth has also exceeded the second threshold (B+δ). If not, control subsystem CS initiates the first level of the hierarchy of bandwidth throttling actions to regulate bandwidth usage to avoid increased bandwidth utilization at step 307 and processing then returns to step 301. This process represents a substantially proactive response to avoid serious problems which may be occasioned by inaction at this point in time. The control subsystem CS, in the example illustrated in Tables A and B, functions to delay all read operations (R) to limit bandwidth usage. Network servers receive requests from clients and act upon them. Therefore, limiting the number of requests in the request queue for a particular network server limits the bandwidth utilized by this network server. The delay of read operations provides time for the request traffic to abate without further action. This procedure "buys time" by delaying presently received read requests for execution at a later time, in anticipation that the network traffic will be at a reduced level as the delayed read operations are executed, thereby "smoothing out" the request workload. This process anticipates that the traffic is irregular and a peak load is simply a transient condition. In addition, the servicing of a read request typically results in a subsequent write and/or transmit file request, therefore delaying a read operation also further delays these subsequent write and/or transmit file request, having a compound effect.

In the third case listed in Tables A and B, the first threshold (B−δ) is exceeded, and it is determined at step 305 that the bandwidth consumed by the network server is at or has begun to exceed the bandwidth (B) allocated for this network server. The control subsystem CS at step 306 then determines whether the effective bandwidth has also exceeded the second threshold (B+δ). If so, the bandwidth utilized exceeds the bandwidth allocated for this network server(B) by greater than a predetermined amount (δ) and further corrective measures must be taken. Processing therefore advances to step 308 where the second tier of bandwidth throttling is activated and processing then returns to step 301. A significant impact on system performance is achieved by rejecting all read requests (R) and delaying a subclass of the previously enabled write (WL) and transmit (TL) requests. In particular, both large write requests (WL) and large transmit requests (TL) are now delayed. The read requests (R) are typically rejected by transmitting an indication to the requesting client that the server is busy or the network is busy. Blocking (delaying) large write and transmit requests delays their impact on the bandwidth and reduces bandwidth utilization quickly, since the delay of a few of these requests has far greater impact than rejecting read requests due to their processing and bandwidth intensive nature. The rejection of large write and large transmit operations may be counterproductive, since a significant amount of processing may have been expended when the bandwidth throttling system BT initiates the delay control process, which expended resources are recouped when the delay period is over. However, a further escalation of the control subsystem CS operation (not shown in Tables A and B) can be the rejection of large write and/or large transmit operations during a severe overload condition.

Variations of the bandwidth throttling scheme illustrated in Tables A and B are possible, and this implementation is provided for the purpose of illustrating the hierarchical nature of the adaptive bandwidth throttling system BT and its adaptability to accommodate the needs of a particular host computer system P and the unique servers operational on the host computer system.

Summary

The adaptive bandwidth throttling system provides a hierarchically organized response to network congestion to escalate the actions taken to mitigate the traffic presented to the network in response to various levels of congestion. The bandwidth throttling system operates on a host computer system to allocate bandwidth to the network servers which are executing on the host computer system as a function of system administrator defined thresholds. The management of the plurality of network servers can be independent of each other, or may be coordinated, as the system administrator deems appropriate. By implementing a hierarchical response to excessive network traffic, the impact on the various network services are minimized. The ability to customize the bandwidth throttling to specific subclasses of services enable the system to impact the services which are deemed by the system administrator to be of the lowest priority and/or whose reduction of service levels has the most beneficial effect on the network. Thus, the adaptive bandwidth throttling system provides a graduated throttling process to incrementally reduce the demand for network bandwidth without disrupting the provision of desired network services. In addition, the bandwidth throttling system can customize the system response as a function of the specific network process which is being regulated. The throttling mechanism can be crafted to correspond to unique needs of the various network processes.

What is claimed:

1. A bandwidth throttling apparatus operational in a computer system which is connected to a network having at least one network server active in said computer system wherein each of said at least one network server provides a plurality of classes of service, and wherein said at least one network server transmits servers transmitting) data via a data transmission connection from said computer system to said network at a predetermined fixed data transmission bandwidth to clients connected to said network, said bandwidth throttling apparatus comprising:

means for determining a presently used bandwidth for each of said at least one network server by way of a data transmission rate measurement during execution of an operation for each of said at least one network server that includes:

means for storing data indicative of said data transmission rate measurement of said operation for n last most recently executed operations for each of said at least one network server, wherein n is a positive integer greater than 2; and means for generating data indicative of an effective presently used bandwidth for each of said at least one network server wherein said effective presently used bandwidth includes an average of said data transmission rate measurement over said n last most recently executed operations;

means, responsive to said effective presently used bandwidth for one of said at least one network server that exceeds a first threshold, for effecting provision of said plurality of classes of service provided by said one of said at least one network server in a first manner; and means, responsive to said effective presently used bandwidth for said one of said at least one network server that exceeds a second threshold that is greater than said first threshold, for effecting provision of said plurality of classes of service provided by said one of at least one network server in a second manner that differs from said first manner.

2. The apparatus of claim 1 wherein said means for effecting provision of service in said first manner comprises:

means for delaying said provision of service to a first set of said plurality of classes of service provided by said one of said at least one network server.

3. The apparatus of claim 2 wherein said means for effecting provision of service in said second manner comprises:

means for rejecting requests for service for said first set of said plurality of classes of service provided by said one of said at least one network server; and means for delaying provision of service to a second set of said plurality of classes of service provided by said one of said at least one network server.

4. The apparatus of claim 2 wherein said means for effecting provision of service in said second manner comprises:

means for rejecting requests for service for a second set of said plurality of classes of service provided by said one of said at least one network server; and means for delaying provision of service to a third set of said plurality of classes of service provided by said one of said at least one network server, wherein both said second and said third sets of said plurality of classes of service provided by said one of said at least one network server include members of said first set of said plurality of classes of service provided by said one of said at least one network server.

5. The apparatus of claim 1 wherein said determining means further comprises:

means for storing data indicative of a predetermined allocated data transmission bandwidth for each of said at least one network server; and means for storing data indicative of said first threshold, which first threshold data comprises an indication of a differential from said predetermined allocated data transmission bandwidth for each of said at least one network server.

6. The apparatus of claim 1 wherein said determining means further comprises:

means for storing data indicative of a predetermined allocated data transmission bandwidth for each of said at least one network server; and means for storing data indicative of said second threshold, which second threshold data comprises an indication of a differential from said predetermined allocated data transmission bandwidth for each of said at least one network server.

7. The apparatus of 1 wherein said first and said second thresholds for each of said at least one network server is independently settable.

8. A method of throttling bandwidth used by network servers, wherein said method is operational in a computer system which is connected to a network having at least one network server active in said computer system, wherein each of said at least one network server provides a plurality of classes of service, and wherein said at least one network server transmits data via a data transmission connection from said computer system to said network at a predetermined fixed data transmission bandwidth to clients connected to said network, said method comprising:

determining a presently used bandwidth for each of said at least one network server by way of a data transmission rate measurement during execution of an operation for each of said at least one network server that includes:

storing data indicative of said data transmission rate measurement of said operation for n last most recently executed operations for each of said at least one network server, wherein n is a positive integer greater than 2; and         generating data indicative of an effective presently used bandwidth for each of said at least one network server wherein said effective presently used bandwidth includes an average of said data transmission rate measurement over said n last most recently executed operations;

effecting provision of said plurality of classes of service provided by one of said at least one network server in a first manner, in response to said effective presently used bandwidth for said one of said at least one network server that exceeds a first threshold; and     effecting provision of said plurality of classes of service provided by said one of said at least one network server in a second manner that differs from said first manner, in response to said effective presently used bandwidth for said one of said at least one network server that exceeds a second threshold that is greater than said first threshold.

9. The method of claim 8 wherein said step of effecting provision of service in said first manner comprises:

delaying said provision of service to a first set of said plurality of classes of service provided by said one of said at least one network server.

10. The method of claim 9 wherein said step of effecting provision of service in said second manner comprises:

rejecting requests for service for said first set of said plurality of classes of service provided by said one of said at least one network server; and     delaying said provision of service to a second set of said plurality of classes of service provided by said one of said at least one network server.

11. The method of claim 9 wherein said step of effecting provision of service in said second manner comprises:

rejecting requests for service for a second set of said plurality of classes of service provided by said one of said at least one network server; and     delaying said provision of service to a third set of said plurality of classes of service provided by said one of said at least one network server, wherein both said second and said third sets of said plurality of classes of service provided by said one of said at least one network server include members of said first set of said plurality of classes of service provided by said one of said at least one network server.

12. The method of claim 8 wherein said step of determining further comprises:

storing data indicative of a predetermined allocated data transmission bandwidth for each of said at least one network server; and     storing data indicative of said first threshold, which first threshold data comprises an indication of a differential from said predetermined allocated data transmission bandwidth for each of said at least one network server.

13. The method of claim 8 wherein said step of determining further comprises:

storing data indicative of a predetermined allocated data transmission bandwidth for each of said at least one network server; and     storing data indicative of said second threshold, which second threshold data comprises an indication of a differential from said predetermined allocated data transmission bandwidth for each of said at least one network server.

14. The method of claim 8 wherein said first and said second thresholds for each of said at least one network server is independently settable.

15. A service regulating apparatus operational in a processor which is connected to a packet switched network and having a plurality of network servers concurrently active in said processor, said network servers transmitting data to requesting clients which are connected to said network via a data transmission connection from said processor to said network, which data transmission connection has a predetermined fixed data transmission bandwidth, comprising:

means for storing data indicative of a predetermined allocated data transmission bandwidth for each of said network servers, each of said network servers providing a plurality of classes of service;

means for determining an effective bandwidth for each of said network servers, comprising:

means for calculating a bandwidth for each operation performed by each of said network servers,         means for tabulating a count of bandwidth used by each of said network servers in each of a plurality of last time intervals,         means for averaging said tabulated count of bandwidth to obtain a value indicative of said effective bandwidth;

means, responsive to said effective bandwidth for a one of said network servers substantially corresponding to said predetermined allocated data transmission bandwidth for said one network server, for delaying a first subset of said plurality of classes of service provided by said one network server; and     means, responsive to said effective bandwidth for said one network server exceeding said predetermined allocated data transmission bandwidth for said one network server, for rejecting requests for said first subset of classes of service provided by said one network server and for delaying service for a second subset of said plurality of classes of service provided by said one network server.

16. A method of throttling bandwidth used by network servers, wherein said method is operational in a processor which is connected to a packet switched network and having a plurality of network servers concurrently active in said processor, said network servers transmitting data to requesting clients which are connected to said network via a data transmission connection from said processor to said network, which data transmission connection has a predetermined fixed data transmission bandwidth, said method comprising the steps of:

storing data indicative of a predetermined allocated data transmission bandwidth for each of said network servers, each of said network servers providing a plurality of classes of service;

determining an effective bandwidth for each of said network servers, comprising:

calculating a bandwidth for each operation performed by each of said network servers, tabulating a count of bandwidth used by each of said network servers in each of a plurality of last time intervals, averaging said tabulated count of bandwidth to obtain a value indicative of said effective bandwidth;

delaying, in response to said effective bandwidth for a one of said network servers substantially corresponding to said predetermined allocated data transmission bandwidth for said one network server, for delaying a first subset of said plurality of classes of service provided by said one network server; and rejecting, in response to said effective bandwidth for said one network server exceeding said predetermined allocated data transmission bandwidth for said one network server, requests for said first subset of classes of service provided by said one network server and for delaying service for a second subset of said plurality of classes of service provided by said one network server.

17. A bandwidth throttling apparatus operational in a computer system connected to a network, said network having a plurality of network servers and at least one network client, said plural of network servers being operational to transmit data via a data transmission connection from said computer system to said network having a predetermined fixed data transmission bandwidth to requesting clients which are connected to said network, said apparatus comprising:

means for determining a presently used bandwidth for each of said plurality of network servers by way of a data transmission rate measurement taken during execution of an operation for each of said plurality of network servers that includes:

first means for storing data indicative of a predetermined allocated data transmission bandwidth for each of said plurality of network servers; and second means for using data indicative of a first threshold, wherein said first threshold includes an indication of a differential from said predetermined allocated data transmission bandwidth for each of said plurality of network servers; and means, for effecting provision of said plurality of classes of service provided by a first one of said plurality of network servers in a manner individually defined for each of a plurality of successively greater thresholds in response to said effective presently used bandwidth of said first one of said plurality of network servers exceeding one of said plurality of successively greater thresholds, wherein said manner defined for said first one of said plurality of network servers differs from every other manner defined for other ones of said plurality of network servers.

18. A method in a computer system for throttling bandwidth used by a plurality of network servers and at least one network client in a network, said plurality of network servers being operational to transmit data via a data transmission connection that has a maximum data transmission bandwidth from said computer system to said network and to requesting ones of said at least one network client that are connected to said network, said method comprising:

determining a presently used bandwidth for each of said plurality of network servers by way of a data transmission rate measurement taken during execution of an operation for each of said plurality of network servers, said step of determining includes:

first step of storing data indicative of a predetermined allocated data transmission bandwidth for each of said plurality of network servers; and second step of storing data indicative of a first threshold, wherein said first threshold includes an indication of a differential from said predetermined allocated data transmission bandwidth for each of said plurality of network servers; and effecting provision of said plurality of classes of service provided by a first one of said plurality of network servers in a manner that is individually defined for a plurality of successively greater thresholds in response to said effective presently used bandwidth of said first one of said plurality of network servers exceeding one of said plurality of successively greater thresholds, wherein said manner defined for said first one of said plurality of network servers differs from every other manner defined for other ones of said plurality of network servers.

* * * * *